Sept. 15, 1964     T. THOMAS ETAL     3,148,606
FOCAL PLANE SHUTTER MECHANISM
Filed Jan. 29, 1963
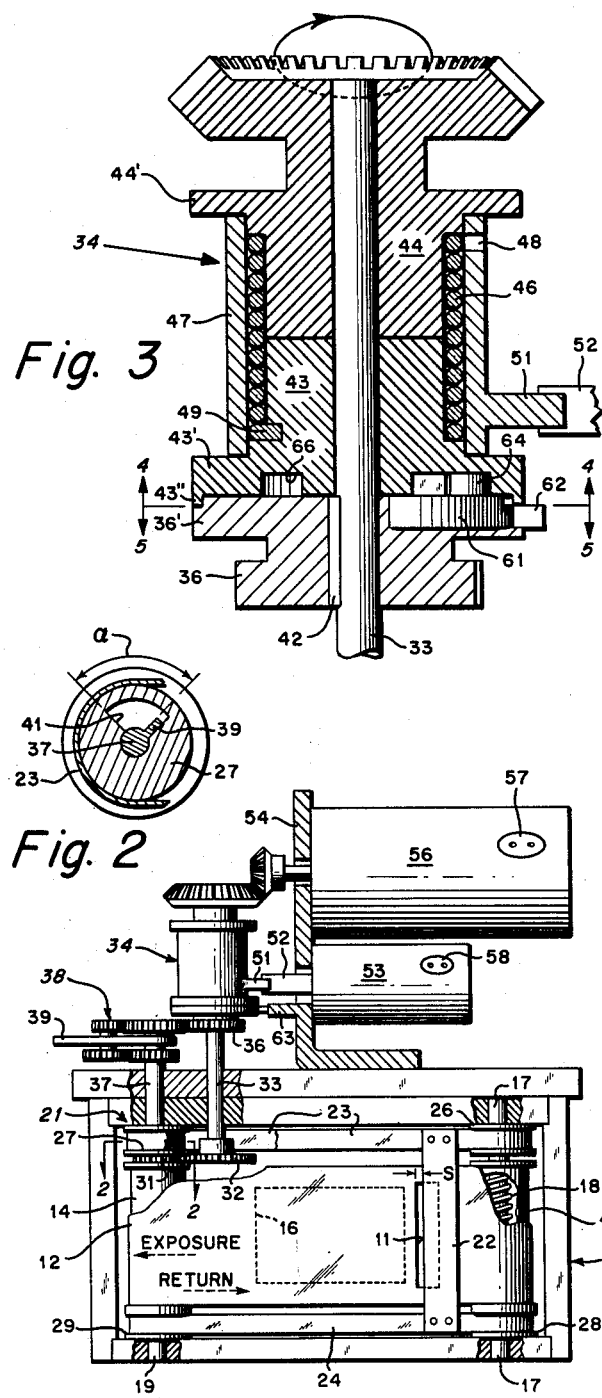
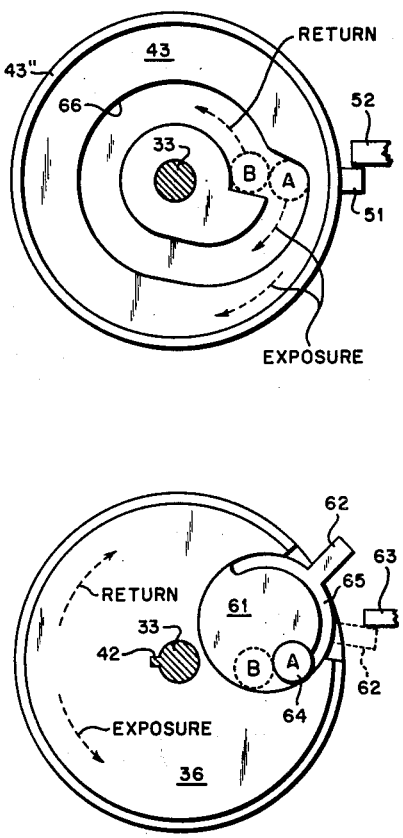
INVENTORS
TERRY THOMAS
RICHARD D. DAFRICO
BY
ATTORNEY

United States Patent Office 3,148,606
Patented Sept. 15, 1964

3,148,606
FOCAL PLANE SHUTTER MECHANISM
Terry Thomas, Jenkintown, and Richard D. Dafrico, Ambler, Pa., assignors to the United States of America as represented by the Secretary of the Navy
Filed Jan. 29, 1963, Ser. No. 254,840
4 Claims. (Cl. 95—57)
(Granted under Title 35, U.S. Code (1952), sec. 266)

The invention described herein may be manufactured and used by or for the Government of the United States of America for governmental purposes without the payment of any royalties thereon or therefor.

The present invention relates to photographic cameras and more particularly to improvements in automatic high speed focal plane shutters for photographic cameras.

One long-existing need, the lack of which has limited the use of focal plane shutter type cameras, is an efficient and reliable mechanism for obtaining rapid and uniform exposure of the film over the entire picture format. This need has become more apparent in high speed aerial photography where a large number of frames per minute require extremely high speed film. But for the deficiencies heretofore present in focal plane shutters, they would be ideally suited for such applications. Exposure control in focal plane shutters has been inadequate for the high speed films used in aerial photography. Designers have traded off design simplicity in order to satisfy the new requirements, or they have diminished camera versatility in order to meet the needs of a specific application in high speed aerial photography.

Accordingly, it is an object of the present invention to overcome the above drawbacks by providing a focal plane shutter mechanism for a camera in which film is uniformly exposed at high speed over the entire picture format, in which a shutter operation is initiated by a single electrical pulse and automatically recycled, and which is especially suitable for rapid sequential film exposure.

Another object of the invention is to provide an improved high speed focal plane shutter mechanism in which the slit width defined thereby is adjustable for a desired film exposure.

Still another object of the invention is to provide an improved focal plane shutter mechanism in which a constant speed power source effects motion only during film exposure through an electric pulse responsive clutch, and in which the shutter is automatically recycled by separate power source.

Still another object of the invention is to provide a relatively simple and inexpensive high speed, recycling focal plane shutter mechanism especially suitable for aerial photographic cameras used in military reconnaissance, and geological or meteorological surveys.

Various other objects and advantages will appear from the following description of one embodiment of the invention, and the most novel features willl be particularly pointed out hereinafter in connection with the appended claims.

With these and other objects in view, the illustrated embodiment of the invention may be generally characterized as comprising a lead curtain and follower mask drivingly connected to the output of a continuous and constant speed unidirectional electric motor through an electric pulse responsive clutch. The follower mask connection to the clutch output further includes a lost-motion connection for positioning the follower mask relative to the lead curtain to occlude light from the picture format while the shutter recycling, and an epicyclic gear train by which the follower mask position can be adjusted relative to the lead curtain thereby adjusting the slit width for a desired exposure. The clutch engages the electric motor by a single pulse to an electric solenoid, thereby driving the curtain and mask across the format in one complete clutch revolution, then the clutch automatically disengages to permit spring-motivated recycling of the curtain and mask irrespective of continued unidirectional rotation of the electric motor. Thus, the pulse rate to the solenoid determines the picture frame rate so long as the period between each pulse is not less than the time required for one clutch revolution plus complete curtain and mask recycling. These and other novel features characteristic of the invention are described in greater particularity hereinbelow.

In the drawings:

FIG. 1 is a diagrammatic representation of a focal plane shutter mechanism of the present invention with portions thereof broken away to show pertinent structural details;

FIG. 2 represents a cross-sectional view of a lost-motion connection in the shutter mechanism taken along the line 2—2 of FIG. 1;

FIG. 3 represents a diametrical cross-sectional view of a clutch assembly in the shutter mechanism taken in a plane parallel to the drawing's surface;

FIG. 4 represents an axial view of the clutch assembly in the direction, and at the element interface, indicated by the arrows 4—4 in FIG. 3; and FIG. 5 represents an axial view of the clutch assembly in the direction, and at the element interface, indicated by the arrows 5—5 in FIG. 3.

In the illustrated embodiment of the invention, primary structural support for the focal plane shutter mechanism obtains from a housing, indicated generally by the numeral 10, which is attachable, in any convenient manner, to a film magazine and an optical system, not shown. The film exposure aperture has its leading edge defined by rectangular opening 11 transversely formed in a flexible, elongated lead curtain 12 with the opposite ends thereof rolled onto a pair of parallel curtain drums 13 and 14. The drums are respectively positioned at opposite sides of housing 10 so that the opening 11 in the curtain 12 will traverse the entire picture format shown in outline by the broken-line rectangle 16. The drum 13 is rotatably supported along its cylindrical axis in the housing 10 on a shaft 17 and a coaxial helical recycling spring 18 therein is connected in torsion between the drum 13 and the shaft 17 thereby urging the curtain 12 to wind onto the drum 13 and unwind from the drum 14. The drum 14 is rotatably supported along its cylindrical axis at one end by a shaft 19 and at the other end by a lost-motion connection 21 described in further detail hereinbelow.

The trailing edge of the exposure aperture, or the width S, is determined by the relative position of a follower mask 22 which has a leading edge parallel to the leading edge of the opening 11. The mask 22 is connected at its ends between two continuous flexible bands 23 and 24 flanking the curtain 12. The band 23 is held taut between an idler sheave 26 and a driving sheave 27 coaxially supported adjacent to corresponding ends of the roller drums 13 and 14, respectively, and independently rotatable therefrom. The band 24 is similarly supported on idler sheaves 28 and 29 at the opposite ends of the drums 13 and 14.

A pinion 31 fixed to the drum 14 for rotation therewith, and adjacent to the drive sheave 27, meshes with a clutch gear 32 fixed at the end of a clutch output shaft 33, the latter being extended through the housing 10 for connection to a clutch assembly indicated generally by the numeral 34. Another clutch gear 36 fixed on the shaft 33 rotates a mask drive shaft 37 through an epicyclic gear train indicated generally by the numeral 38. The transmission speed ratio in the gear train 38 is chosen so that the curtain 12 and the mask 22 travel at exactly the same speed during exposure. For example, if the diameters of the roller 14 and the sheave 27 are equal, the effective ratio in the gear train 38 is unity. A carrier arm 39 manually and independently rotatable about the axis of the shaft 37 produces angular displacement in rotation between shafts 33 and 37. As will be apparent, this angular displacement determines the aperture width S; that is, the opening defined by the leading edges of the opening 11 and the mask 22 during exposure motion.

The lost-motion connection 21 is best understood by reference to FIG. 2 wherein the mask drive shaft 37 is shown as including a radial pin 39 extending into a segmental groove 41 radially formed in the sheave 27. The segmental angle α determines the amount of travel of the curtain 12 in the return or recycling direction before the mask 22 begins to follow. The mask 22 is at least as wide as the opening 11 in the curtain 12, and the amount of curtain travel through the angle α is sufficient for the mask 22 to completely occlude the opening 11 during recycling. Thus, the picture format receives light only during the exposure pass of the curtain 12 and mask 22.

The clutch assembly 34 provides a constant speed drive to the curtain 12 and mask 22 only during the exposure pass, and will now be described in more detail. Referring to FIG. 3, it will be noted that the drive gear 36 and the drive shaft 33 are connected for simultaneous rotation by a key 42 and that the shaft 33 extends upward the entire length of the clutch assembly 34 to provide a common rotation axis for a clutch cam 43 and a clutch input gear 44 journaled in tandem. The abutting ends of the cam 43 and gear 44 are slidable with respect to each other and form a cylindrical spool of constant diameter with outer flanged ends 43′ and 44′ respectively. A helical spring 46 is coaxially disposed about the spool thus formed and between the flanges 43′ and 44′ in gripping relationship to the cam 43 and the gear 44, forming thereby a positive unidirectional drive connection from the gear 44 to the cam 43. The helical spring 46 is wound in a counter-clockwise direction, as viewed from the top of FIG. 3, so that counter-clockwise rotation of the input gear 44 will in fact produce tighter gripping action of the spring 46 on the cam 43 and gear 44, and rotation in the clockwise direction will decrease the gripping action and destroy the drive connection from the gear 44 to the cam 43. Furthermore, if the upper end 48 of the spring 46 is separately urged in the torsion in the clockwise direction relative to the gear 44, the spring 46 will separate from the spool portion of the gear 44 thereby disestablishing a positive drive to the cam 43. This latter principle is mechanically implemented by a clutch sleeve 47 concentrically disposed about the spring 46 and engaging the spring 46 at the upper end 48. The lower end 49 of the spring 46 may be connected to the cam 43 to insure against any possibility of slippage therebetween.

An arm 51 radially extends from the sleeve 47 into engagement with a normally extended armature 52 of an electric solenoid 53 which in turn is fixed on a support angle 54 rigidly extending from the housing 10. The armature 52 is spring-biased in the extended position. A constant speed electric motor 56 is also secured to the angle 54 with its output shaft drivingly connected through bevel teeth to the clutch input gear 44. A continuous electric power supply to the motor 56 and an electrical pulse to the solenoid 53 are provided through the connectors 57 and 58, respectively.

With the clutch structure thus far described, it should now be apparent that during continuous running of the motor 56, an electric pulse to the solenoid 53 retracts the armature 52 from the normally extended position, thereby releasing the arm 51 to allow the spring 46 to grip around both the cam 43 and the gear 44 and rotate in unison about the axis of the shaft 33. Immediately after the arm 51 is released, the spring bias on the armature 52 returns it to the normally extended position so that the arm 51 is again blocked from further rotation after one complete revolution. That is, each pulse to the solenoid 53 will advance the cam 43 one revolution in the same counter-clockwise direction as the input gear 44.

As the cam 43 advances, it also directly drives the clutch output gear 36 one complete revolution, but then the drive connection terminates and the recycling spring 18 returns the gear 36 to its starting position. In this manner, each pulse applied to the solenoid 53 produces a one-revolution oscillation at clutch output gear 36: one revolution counter-clockwise at constant speed followed immediately by one revolution clockwise at an uncontrolled speed. This intermittent constant speed drive function is accomplished through a generally cylindrical cam follower 61 slidably inserted in the end of gear 36 adjacent to the cam 43 and exposed thereto. As best seen in FIG. 5, the circumference of the follower 61 is substantially tangential to the circumference of the gear flange 36′ and includes a radial tab 62 protruding from the gear flange 36′ to engage a fixed stop 63 rigidly extending from the angle 54. A portion of the gear flange 36′ adjacent to the tab 62 is recessed to afford limited rotation of the follower 61 about its own axis. The follower 61 is also recessed over a portion 65 to afford an uninterrupted lip configuration 43″ on the circumference of cam 43 where it adjoins the gear flange 36′. The follower 61 is retained entirely within the gear 36 by the confronting end of the cam 43 except for a short cylindrical land 64 displaced from the center of the follower 61 and protruding therefrom into a continuous cam race 66 formed in the cam 43 about its axis. The race 66 determines the position of the land 64, and consequently the position of the tab 62, for relative angular positions of the output gear 36 and the cam 43.

The configuration of the race 66 may be best described as being substantially a 360-degree spiral groove made continuous by a radial groove joining the inner and outer ends. In a start position wherein the camera is cocked ready for exposure, the cam follower 61 is in the position shown in solid lines in FIG. 5. The land 64 is positioned in the race 66 at the outer end of the spiral, being urged there by the force of the recycling spring 18 transmitted through the gears 31 and 32. This position is indicated by the letter A in FIGS. 4 and 5. When the armature 52 is momentarily retracted out of contact with the arm 51, the motor 56 drives the cam 43 clockwise as viewed in FIG. 4. Since the land 64 abuts the steep radial portion of the race 64, the follower 61 and the gear 36 move simultaneously with the cam 43. When the follower 61 has revolved one complete revolution, the tab 62 strikes the stop 65 causing the follower 61 to rotate about its own axis relative to the gear 36 so that the land 64 moves radially in the race 66 to the inner end of the spiral race as shown by the letter B in FIGS. 4 and 5. Now, since the race 66 does not contain the land 64 against counterclockwise rotation as viewed on FIG. 4, return spring 18 drives the gear 36 and the follower 61 back to the start position A as cam 43 continues to rotate until the arm 51 re-engages the armature 52.

Having described one embodiment of the invention, many advantages derived therefrom should now be readily apparent. For example, a constant speed focal plane shutter is obtained which is automatically recycled by a novel and simple clutch arrangement. A complete shutter cycle is initiated by a single short electrical pulse and the shutter retains the versatility and advantages of the more complex adjustable slit shutters of the prior art. These and other advantages add up to an extremely simple, lightweight and inexpensive focal plane shutter mechanism especially suitable for use in aerial cameras.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In an automatic resetting focal plane shutter for cameras, the combination comprising:
 a pair of curtain drums spaced in parallel relation to each other;
 a curtain wound endwise therebetween and having an aperture therein;
 a sheave coaxial with each of said drums and supporting an endless band therebetween;
 a mask fixed to said bands adjacent to the aperture of said curtain defining thereby the width of the exposure slit during exposure;
 a rotatable clutch means having an output drivingly connected to one of said drums for transporting the aperture of said curtain across a picture format;
 an epicyclic gear means and a lost-motion means connected in series between the output of said clutch means and one of said sheaves for transporting said mask in unison with said curtain;
 said gear means including slit adjusting means for varying the position of said mask relative to said curtain;
 said lost-motion means providing limited relative motion between said curtain and said mask for occluding the exposure aperture during resetting;
 a unidirectional constant speed motor drivingly connected to the input of said clutch for transporting said curtain and mask in one direction during exposure;
 spring means operatively connected to one of said drums for transporting said curtain and mask in the opposite direction during resetting;
 said clutch means including electrical pulse responsive means for establishing a driving connection for one revolution of said clutch means, and angular position responsive means for recycling said curtain and said mask at the completion of said one revolution;
 whereby the shutter is driven at a constant speed for exposure and is automatically reset by a single electrical pulse.

2. In an automatic resetting focal plane shutter for cameras, the combination comprising:
 a curtain transportable endwise and having an aperture therein;
 a mask adjacent to the aperture of said curtain and transportable along the length thereof defining thereby the width of the exposure slit during exposure;
 a rotatable clutch means having an output drivingly connected to said curtain for transporting the aperture thereof across a picture format;
 an epicyclic gear means and a lost-motion means connected in series between the output of said clutch means and said mask for transporting said mask in unison with said curtain;
 said gear means including slit adjusting means for varying the position of said mask relative to said curtain;
 said lost-motion means providing limited relative motion between said curtain and said mask for occluding the exposure aperture during resetting;
 a unidirectional constant speed motor drivingly connected to the input of said clutch for transporting said curtain and mask in one direction during exposure;
 spring means operatively connected to said curtain for transporting said curtain and mask in the opposite direction during resetting;
 said clutch means including electrical pulse responsive means for establishing a driving connection for one revolution of said clutch means, and angular position responsive means for recycling said curtain and said mask at the completion of said one revolution;
 whereby the shutter is driven at a constant speed for exposure and is automatically reset by a single electrical pulse.

3. In an automatic resetting focal plane shutter for cameras, the combination comprising:
 a curtain transportable endwise and having an aperture therein;
 a mask adjacent to the aperture of said curtain and transportable along the length thereof defining the width of the exposure slit during exposure;
 a rotatable clutch means having an output drivingly connected to said curtain for transporting the aperture thereof across a picture format;
 an epicyclic gear means connected between the output of said clutch means and said mask for transporting said mask in unison with said curtain;
 said gear means including slit adjusting means for varying the position of said mask relative to said curtain;
 a unidirectional constant speed motor drivingly connected to the input of said clutch for transporting said curtain and mask in one direction during exposure;
 resilient means operatively connected to said curtain for transporting said curtain and mask in the opposite direction during resetting;
 said clutch means including electrical pulse responsive means for establishing a driving connection for one revolution of said clutch means, and angular position responsive means for recycling said curtain and said mask at the completion of said one revolution;
 whereby the shutter is driven at a constant speed for exposure and is automatically reset by a single electrical pulse.

4. In an automatic resetting focal plane shutter for cameras the combination comprising:
 a curtain transportable endwise and having an aperture therein;
 a mask fixed adjacent to the aperture of sad curtain defining thereby the width of the exposure slit during exposure;
 a rotatable clutch means having an output drivingly connected to said curtain and mask for transporting the exposure slit across a picture format;
 a unidirectional constant speed motor drivingly connected to the input of said clutch for transporting said curtain and mask in one direction during exposure;
 resilient means operatively connected to said curtain for transporting said curtain and mask in the opposite direction during resetting;
 said clutch means including electrical pulse responsive means for establishing a driving connection for one revolution of said clutch means, and angular position responsive means for resetting said curtain and said mask at the completion of said one revolution;
 whereby the shuter is driven at a constant speed for exposure and is automatically reset by a single electrical pulse.

References Cited in the file of this patent
UNITED STATES PATENTS

| | | |
|---|---|---|
| 2,517,658 | Gorey | Aug. 8, 1950 |
| 2,939,973 | Crane | June 7, 1960 |
| 3,087,401 | Maurer | Apr. 30, 1963 |
| 3,113,498 | Kallenberg | Dec. 10, 1963 |
| 3,114,850 | Hansen | Dec. 17, 1963 |